Patented Mar. 19, 1940

2,194,216

UNITED STATES PATENT OFFICE 2,194,216

MANUFACTURE OF A STARCH ADHESIVE AND ADHESIVE BASE

Philip Dalton Coppock, Higher Bebington, Cheshire, England

No Drawing. Application March 23, 1937, Serial No. 132,619. In Great Britain March 31, 1936

10 Claims. (Cl. 134—23.4)

This invention relates to adhesive compositions derived from cold water swelling starch powders and has for its chief object to provide an improved starch preparation from which the yield of adhesive paste obtainable by the application of cold water is greater than hitherto, the paste itself being stable and uniform in composition.

According to the present invention the adhesive composition is obtained from cold water swelling starch powder, water, and a small proportion of an alkaline earth oxide or hydroxide, the particles of which have been 'stabilised', that is to say protected against the carbonating effect of the carbon dioxide in the atmosphere.

The most suitable oxide is slaked lime because of its cheapness but equivalent quantities of the oxide or hydroxide of barium or strontium may be employed.

In order to stabilise the oxide or hydroxide the most convenient way is to treat it intimately with oil as by grinding so as to reduce the rate of carbon dioxide absorption of the particles by filming them with the oil.

The most convenient filming oil to employ is a mineral oil because of its cheapness, its inertness to alkali oxide or hydroxide and its stability. Vegetable or animal or fish oils may however be employed provided they are stable and are not appreciably acted upon in the cold by the alkaline earth oxide or hydroxide.

The 'stabilised' oxide or hydroxide can be admixed with a cold water paste powder and this can then be treated with water in the usual way to form a paste. Alternatively, the oxide or hydroxide may be added separately to the water to which the paste powder is subsequently added. Addition of excess of oxide or hydroxide, however, is to be avoided, as this may even reduce the yield of paste. Addition of about 2 per cent. of slaked lime to cold water paste powder gives a pronounced increase in yield of paste, but more than about 8 per cent. of slaked lime may even reduce the yield. Other ingredients, such as soap, or other wetting agents, may be added to the cold water paste powder together with, if necessary, fillers such as calcium carbonate or barium sulphate; also the non-acidic reagents commonly used to modify the characteristics of starch paste, such, for example, as borax or alkali aluminates, may be added if desired.

In order that the invention may be clearly understood and readily carried into effect the same will now be described with reference to one specific procedure in accordance therewith.

A quantity of slaked lime is placed in an ordinary dry flour mixer, and a suitable mineral oil, such as that known as Shell J5 separator oil, is allowed to drop slowly into the lime. For 42.5 lbs. of slaked lime a suitable quantity of the oil is 7.5 lbs. and a suitable time of addition is several hours, during which period the mixture is kept in constant motion so that the lime particles become thoroughly filmed. This lime is thus stabilised and ready for use.

In a separate dry mixer 90 lbs. of plain cold water swelling starch are mixed with 10 lbs. of the oil filmed lime. This is mixed for 10 minutes.

10 lbs. of fine soap powder are mixed with 390 lbs. of plain cold water swelling starch, in an ordinary dry flour mixer. This is mixed for 10 minutes.

The mixture containing the oil filmed lime is then run into the mixture containing the soap powder and the whole bulk of material is mixed for 5 minutes. This gives a 500 lb. batch of the improved cold water paste powder according to the present invention, its percentage composition being as follows:—

| | Per cent. by weight |
|---|---|
| Cold water swelling starch | 96 |
| Powdered soap | 2 |
| Oil filmed slaked lime | 2 |

What I claim is:

1. A cold water swelling starch powder containing a small proportion of an alkaline earth oxide the particles of which have been intimately admixed with sufficient oil to film the oxide particles to protect them against the carbonating effect of carbon dioxide in the atmosphere.

2. A cold water swelling starch powder containing a small proportion of an alkaline earth hydroxide intimately pre-admixed with sufficient oil to film the hydroxide particles.

3. A cold water swelling starch powder containing a small proportion of slaked lime the particles of which have been admixed with sufficient oil to film the said particles and to protect them against the carbonating effect of carbon dioxide in the atmosphere.

4. A cold water swelling starch powder comprising essentially an intimate admixture of a plain cold water swelling starch and from about two to eight per cent of slaked lime the particles of which have been filmed with oil to protect the said particles against the carbonating effect of carbon dioxide in the atmosphere.

5. A cold water swelling starch powder containing a small proportion of an intimate admixture of slaked lime the particles of which have been admixed with sufficient mineral oil to film the said particles and to protect them against the carbonating effect of carbon dioxide in the atmosphere.

6. An adhesive composition comprising a high proportion of a cold water swelling starch and water and a small proportion of slaked lime with which has been pre-admixed sufficient oil to film the particles.

7. An adhesive composition comprising a high proportion of a cold water swelling starch and water and a small proportion of pre-admixed slaked lime and mineral oil.

8. An adhesive composition comprising cold water swelling starch and water and about two per cent relatively to the starch of pre-admixed slaked lime and oil sufficient to film the lime particles.

9. A method of manufacturing an adhesive paste composition consisting in mixing a cold water swelling starch powder with from about two to eight per cent of slaked lime stabilized against conversion to carbonate by intimate pre-admixture with an oil, and then adding water to form the paste.

10. A method of manufacturing an adhesive paste composition consisting in stabilising slaked lime against conversion to carbonate by intimately admixing it with sufficient oil to film the particles, mixing the stabilized lime with water and intimately admixing therewith a cold water swelling starch.

PHILIP D. COPPOCK.